United States Patent
Fuller et al.

(10) Patent No.: US 7,152,189 B2
(45) Date of Patent: Dec. 19, 2006

(54) TESTING DISTRIBUTED SERVICES BY USING MULTIPLE BOOTS TO TIMESHARE A SINGLE COMPUTER

(75) Inventors: Billy J. Fuller, Woodinville, WA (US); Samuel R. Devasahayam, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 538 days.

(21) Appl. No.: 10/680,651

(22) Filed: Oct. 7, 2003

(65) Prior Publication Data

US 2005/0076195 A1    Apr. 7, 2005

(51) Int. Cl.
*G06F 11/00* (2006.01)
(52) U.S. Cl. ...................................... 714/43
(58) Field of Classification Search ................ 714/43, 714/47, 45, 46, 31, 6, 7; 709/223, 224
See application file for complete search history.

(56) References Cited

U.S. PATENT DOCUMENTS

| | | | |
|---|---|---|---|
| 5,909,544 A * | 6/1999 | Anderson et al. ........... 709/208 |
| 5,951,697 A * | 9/1999 | O'Donnell et al. ........... 714/37 |
| 5,974,567 A * | 10/1999 | Dickson et al. .............. 714/27 |
| 6,101,617 A * | 8/2000 | Burckhartt et al. ........... 714/23 |
| 6,167,532 A * | 12/2000 | Wisecup ...................... 714/23 |
| 6,324,492 B1 | 11/2001 | Rowe |
| 6,529,966 B1 | 3/2003 | Wilman et al. |
| 6,823,482 B1 * | 11/2004 | Ahrens et al. ................ 714/57 |
| 2004/0083208 A1 * | 4/2004 | Kroening et al. ............. 707/3 |

OTHER PUBLICATIONS

"*Multiple Boot Manager*" (Dec. 6, 2002), retrieved from http://elm-chan.org/fsw/mbm/mbm_e.html ,pp. 1-4.
Microsoft Knowledge Base Article-217210, *How to Multiple Boot Windows XP, Windows 2000, Windows NT, Windows 95, Windows 98, Windows Me, and MS-DOS* retrieved from http://support.microsoft.com/?kbid=21720, pp. 1-5 on Oct. 7, 2003.
Kumar, S., "*Generic Virus Scanner in C*", Technical Report CSD-TR-92-062 (Sep. 17, 1992), in the Proceedings of the 8th Computer Security Application Conference IEEE Press, 1992, pp. 1-21.
Power Quest, "*Solution: Multiple Boot Scenarios*", retrieved from http://www.powerquest.com/support/primus/id3824.cfm, pp. 1-2 on Oct. 7, 2003.

(Continued)

*Primary Examiner*—Nadeem Iqbal
(74) *Attorney, Agent, or Firm*—Wolf, Greenfield & Sacks, P.C.

(57) ABSTRACT

An improved scalability testing architecture for distributed applications allows testing of scalability with respect to a given number of computers using a test network having only a small fraction of that number of computers. Each client computer in the test network hosts multiple bootable systems in bootable partitions which timeshare the host machine on a mutually exclusive basis. A launcher in each bootable system verifies scheduling information for an instance of an application under test residing in the same partition and either permits or prevents continued operation of the instance based on the scheduling information. If continued operation is to be prevented, the launcher triggers a boot next routine to exit and cede control of the computer to the next bootable system on the computer.

20 Claims, 10 Drawing Sheets

OTHER PUBLICATIONS

JUMBO, *ACDsee PowerPack*, retrieved from http://www.jumbo.com/utilities/dos/bootutil/bootma33.zip.download.htp on Oct. 7, 2003.

"*The Best Multiple-Boot Utility*", Finding the best tool for multiple operating systems on one machine, (Jan. 25, 2002), retrieved from http://linuxworld.sys-con.com/story/32715_p.htm.

VertiTest>Services>Scalability testing, "*Scalability Testing*", retrieved from http://www.veritest,com/services/scalability.asp?vistor+X, pp. 1-2 on Oct. 7, 2003.

Che, Bryan, "*ArsDigita Scalability Testing*", (Apr. 25, 2001), retrieved from http://eveander.com/arsdigita/asj/arsdigita-scalability-testing, pp. 1-17.

"*Comdex: Sun touts Solaris 8 as Windows 2000 alternative*", (Nov. 22, 1999), retrieved from http://www.cnn.com/TECH/computing/9911/22/solaris8.ent.idg/index.html.

Haney, Clare, et al., "*Gates emphasizes XML introduces new Net appliance*", (Nov. 15, 1999), retrieved from http://www.cnn.com/TECH/computing/9911/15/comdex.gatesidg/index.html, pp. 1-5.

High Performance Computers, Technical Afterward, "*Changing High Performance Computer Technology Is Making Export Control More Difficult*", retrieved from http://www.cnn.com/ALLPOLITICS/resources/1999/cox.report/hpc/pg9.html, pp. 1-17 on Oct. 7, 2003.

* cited by examiner

TESTING DISTRIBUTED SERVICES BY USING MULTIPLE BOOTS TO TIMESHARE A SINGLE COMPUTER

FIELD OF THE INVENTION

This invention relates generally to software testing and, more particularly, relates to a system and method for testing a distributed service using multiple boots timesharing individual computers in a test network.

BACKGROUND

Businesses and other enterprises and entities are increasingly utilizing computer networks to manage their business and other activities. Such networks provide numerous benefits including extended access to localized resources, rapid sharing of information and so forth. Thus, a number of applications and services are now designed to run over or utilize network connections as part of their normal function. As the networks used by businesses and others become larger and more highly populated, the issue of scalability must be considered. For example, a distributed system that works well with 10 computers may fail catastrophically when used with 1000 computers. Such failures are difficult to predict generally, and thus scalability testing is typically performed to verify the proper operation of products intended for large scale application.

Typically, only one copy of a given application (e.g. a client portion of a distributed service) can be run on each client machine, so special techniques are typically used to perform scalability testing to verify operation over a vast network. Techniques that have been used in the past to perform scalability testing include (1) simply using the system under test on the required number of machines and observing the results, (2) simulation, (3) emulation, and (4) alteration of the product under test to allow multiple copies to run on a given machine. Each of these techniques, however, has significant deficiencies.

With respect to the first technique mentioned above, the use of a collection of machines to directly test scalability with respect to a network of the same number of machines is not feasible for large networks. In particular, network sizes can be so large that the cost of securing and setting up the proper number of machines is prohibitive for the tester. With respect to simulation, this technique is also not feasible for very large networks since, among other problems, the load on the system resources of the testing machines becomes quite severe. With respect to emulation, typically the software that is run during the test is an altered form of the software for which scalability testing is desired. Given this, several drawbacks are apparent, including the need to independently develop and test the new version. In addition the test is an indirect test at best since it does not test the actual software of interest.

Finally, the modification of the software of interest to allow multiple copies to run simultaneously on a given machine has a number of drawbacks, including some of those mentioned above. The use of such modified applications still taxes the system resources as with simulation, requires resources for creation of the modified version, and in addition does not provide a test of the actual product of interest since it tests a specialized version.

Thus, although scalability of software products to large networks is desirable and in many cases necessary, existing methods of testing such scalability are unsatisfactory. A method of scalability testing is needed whereby a software product or system can itself be tested for scalability without encountering the deficiencies found in prior testing systems and techniques.

BRIEF SUMMARY OF THE INVENTION

Embodiments of the invention provide a novel scalability testing system and method that allows testing of application or system scalability to large networks without simulation or emulation of the application under test, and without creating a test network of the same size as the target network. In particular, embodiments of the invention employ multiple timeshared bootable partitions on each of one or more computers in a test network to test the scalability of a software system to a much greater number of computers, e.g. the number of computers in the target network. Each bootable partition comprises a copy of the application under test, and in addition may comprise, in embodiments of the invention, a launcher, a scheduler, and information regarding a server for retrieving a command file from the server.

When a particular partition boots, the launcher runs and initially copies the command file from the server, and runs the command file. Subsequently the launcher calls a scheduler to determine if the instance of the software under test in the particular bootable system corresponding to the partition should be running. If the instance should be running, then the launcher lies dormant for a predetermined wait period such as 1 minute, and then repeats the process beginning with the copying of the command file. If the instance should not be running, then the launcher runs a boot next routine to shut down the current partition and boot the next partition on the computer. When the next bootable system boots, it follows the same process described above. In this way, the bootable systems on each computer timeshare the computer, running on a mutually exclusive basis.

It will be appreciated that the system described herein allows an application or system to be tested for scalability to a particular number of computers using a test facility that utilizes only a fraction of that number of computers. For example, if there are four bootable partitions per computer, then a test network of 1000 computers can be used to test scalability up to a target network size of 4000 computers. In addition, since only a fraction of the total number of bootable systems will be online at a given time, any probable unintended dependencies between machines in the target network may be more easily identified in the test network and eliminated during testing. Furthermore, no specialized versions of the software under test are needed, since the actual software of interest is run in each partition.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
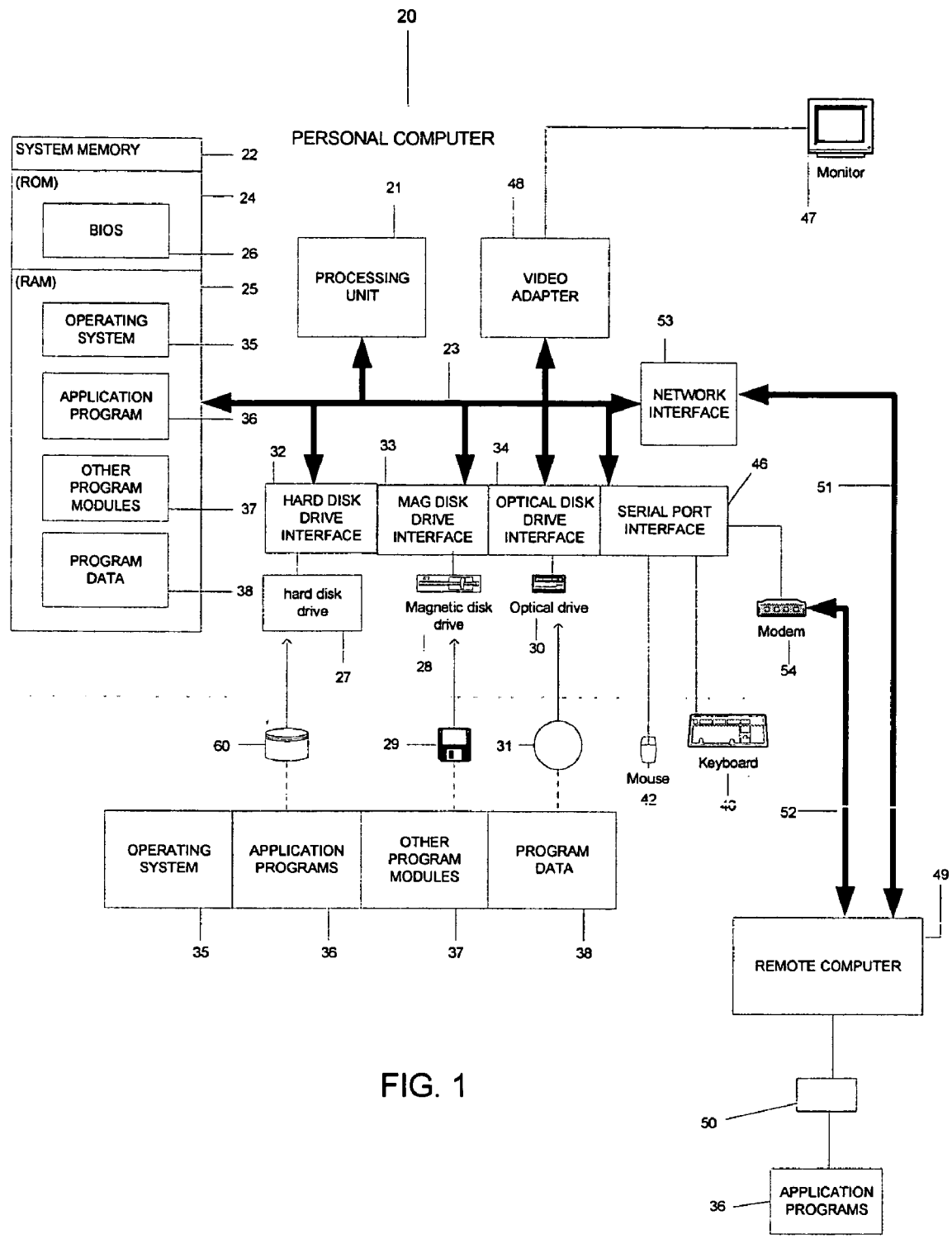
FIG. 1 is a block diagram generally illustrating an exemplary device architecture in which embodiments of the present invention may be implemented.

Turning to the drawings, wherein like reference numerals refer to like elements, the invention is illustrated as being implemented in a suitable computing environment. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

This description begins with a description of a general-purpose computing device that may be used in an exemplary system for implementing the invention, after which the invention will be described in greater detail with reference to the remaining figures. Turning now to FIG. 1, a general purpose computing device is shown in the form of a conventional computer 20, including a processing unit 21, a system memory 22, and a system bus 23 that couples various system components including the system memory to the processing unit 21. The system bus 23 comprises one or more physical busses of any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. In an embodiment of the invention, the hard disk 60 comprises multiple bootable partitions, each of which contains a bootable system, and each bootable system may comprise an operating system and other elements as described above.

A user may enter commands and information into the computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, computers may include other peripheral output devices, not shown, such as speakers and printers.

The computer 20 operates in a networked environment using logical connections to one or more remote computers, such as a remote computer 49. The remote computer 49 may be a domain controller, server, a router, a network PC, a personal computer, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52.

Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the WAN 52. The modem 54, which may be internal or external, is connected to the system bus 23 via the serial port interface 46. Program modules depicted relative to the computer 20, or portions thereof, may be stored in the remote memory storage device if such is present. It will be appreciated that the network connections shown are exemplary and other means of establishing a communications link between the computers may be used.

Herein, the invention will generally be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware. In the following discussion, computing devices such as clients, domain controllers, servers, and so on may be of the architecture as described above with respect to FIG. 1 regarding computer 20 and/or remote computer 49, or may alternatively have any other type of architecture.

Figure 2:
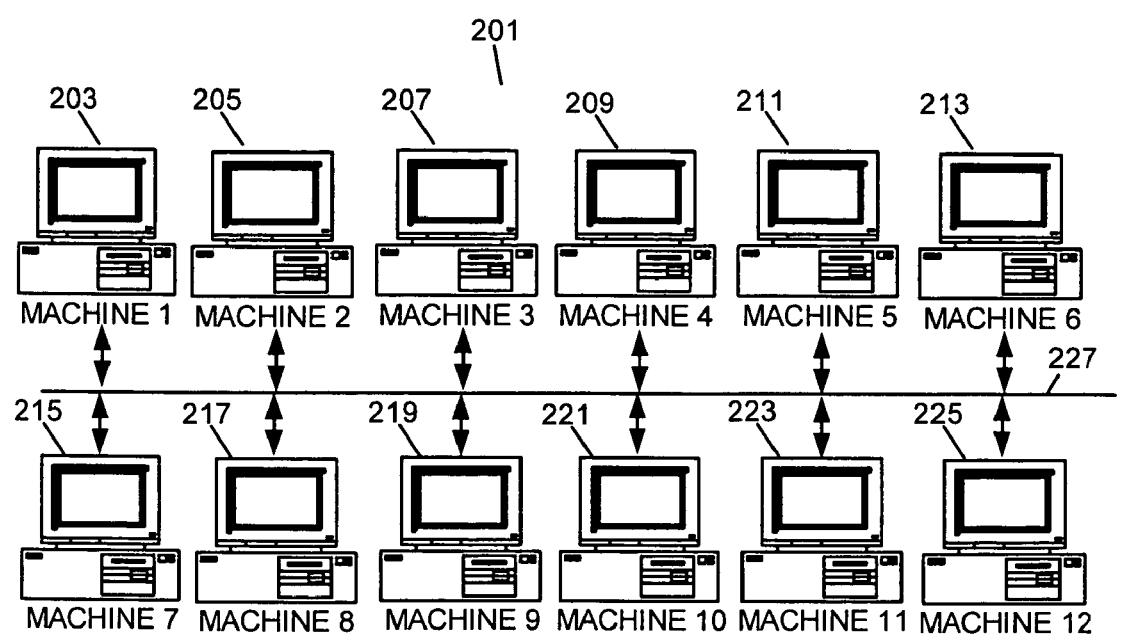
FIG. 2 is a schematic diagram of a target network environment within which a distributed service may be deployed.

FIG. 2 illustrates in simplified schematic form an example computer network environment 201 within which a distributed application, service, or system may be implemented. As used herein, a distributed application, service, or system is any software, similar components or instances of which run on a plurality of computing which components or instances exploit the network connections of their respective machines to send and/or receive information.

In the diagram of FIG. 2, each of twelve computers 203, 205, 207, 209, 211, 213, 215, 217, 219, 221, 223, and 225 is connected to each other of the computers 203, 205, 207, 209, 211, 213, 215, 217, 219, 221, 223, and 225 via network 227. The aforementioned computers are labeled as Machine 1 through Machine 12 for convenience of reference hereinafter. It will be appreciated that the number of machines shown in FIG. 2 is much less than the number of machines that would typically be deployed in a large network for which scalability is a concern, however, the number of computers in the figure has been reduced for ease of illustration and understanding. Thus, FIG. 2 is s simplified diagram of a target network.

Typically, in order to test the scalability of a software system to a network such as illustrated in FIG. 2 without simulation, emulation, or modification of the software of interest, the software system would need to actually be deployed in a matching network, i.e. a test network of twelve machines for the illustrated example. After a sufficient period of successful deployment in such conditions, scalability to networks of that same size can be inferred with reasonable confidence. However, as noted above, typical systems wherein scalability is a concern comprise thousands of computers, and the cost of acquiring, setting up, running, and maintaining a network of such a large number of machines may be prohibitive for the tester, who is typically a software developer with limited available hardware.

Figure 3A:
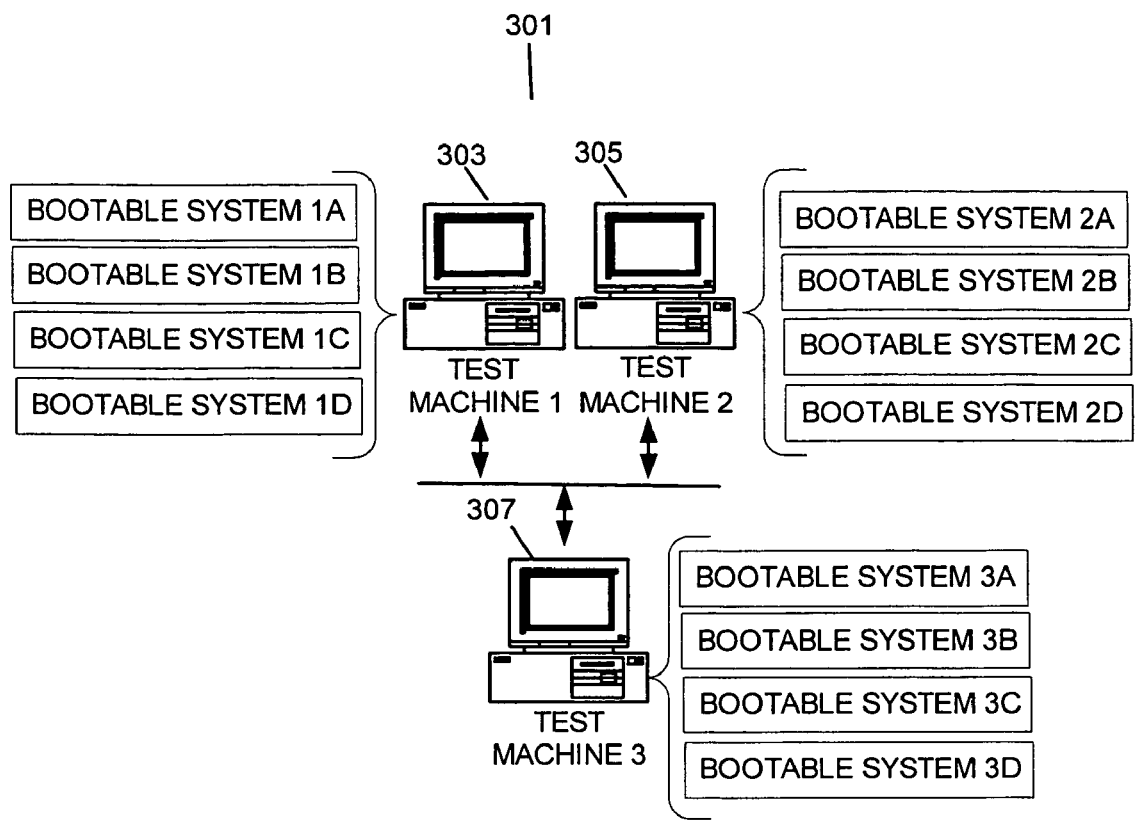
FIG. 3A is a schematic diagram of an example test network architecture corresponding to the target network architecture of FIG. 2 and others within an embodiment of the invention.

The system according to the exemplary embodiments of the invention described herein allows for scalability testing for a target network having a given number of machines using a test network having just a small fraction of that number of machines. The architecture of one such system according to an embodiment of the invention is illustrated in FIG. 3A. In particular, the illustrated architecture 301 employs three machines 303, 305, and 307, referred to as Test Machine 1, Test Machine 2, and Test Machine 3, to test scalability of a software system to a target network of twelve machines, such as the network shown in FIG. 2. Each test machine 303, 305, 307 comprises four bootable partitions, each of which comprises a bootable system to be discussed in greater detail hereinafter.

These bootable partitions are illustrated as Bootable System 1A (311), Bootable System 1B (313), Bootable System 1C (315), and Bootable System 1D (317) with respect to Test Machine 1 (303), Bootable System 2A (319), Bootable System 2B (321), Bootable System 2C (323), and Bootable System 2D (325) with respect to Test Machine 2 (305), and Bootable System 3A (327), Bootable System 3B (3129), Bootable System 3C (331), and Bootable System 3D (333) with respect to Test Machine 3 (307). Each of the bootable systems 311, 313, 315, 317, 319, 321, 323, 325, 327, 329, 331, and 333 runs on its respective test machine 303, 305, 307 on a time shared basis with each other bootable system on the same test machine. In this manner, three bootable systems are running in the test network 301 at any given time.

Figure 3B:
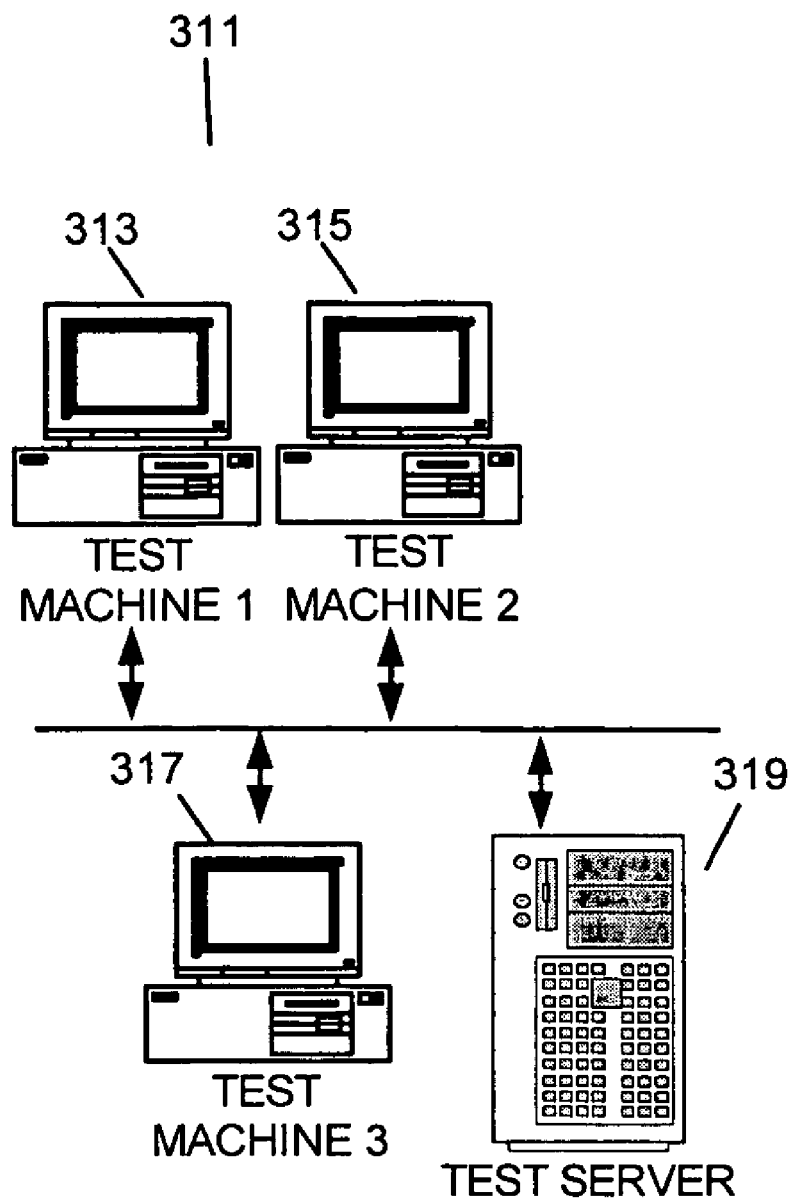
FIG. 3B is a schematic diagram of an alternative test network architecture corresponding to the target network architecture of FIG. 2 and others within an embodiment of the invention.

An alternative architecture to the test network 301 is illustrated in FIG. 3B. The test network 311 of FIG. 3B comprises Test Machine 1 (313), Test Machine 2 (315), and Test Machine 3 (317) as in FIG. 3A. Although not illustrated for clarity, each test machine 313, 315, 317 similarly comprises a plurality of bootable systems. In addition, the test network 311 comprises a test server 319 that does not represent any portion of the actual target system. Rather, the test server 319 is used to aid in the test by logging status or other information and/or by providing stimulus or test case information to the test machines 313, 315, 317. The role of the test server 319 according to an embodiment of the invention will be described in greater detail hereinafter by reference to other figures.

Figure 4:
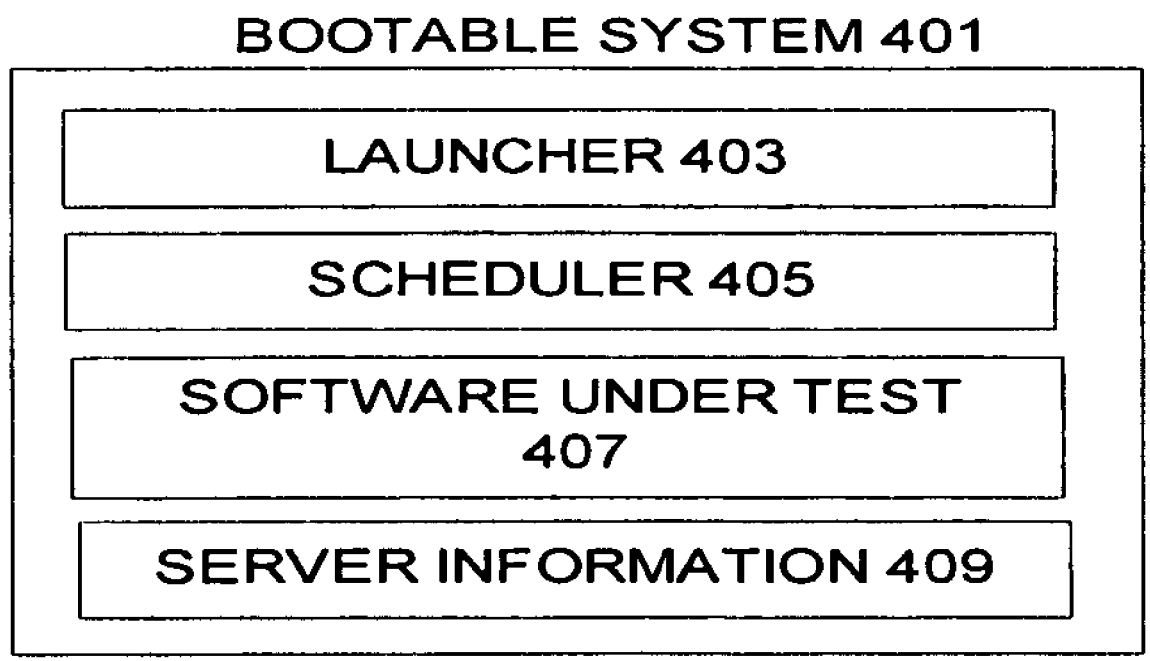
FIG. 4 is a schematic diagram of a bootable system for use in a partition of a test machine in a test network according to an embodiment of the invention.

As described above, each machine in a test network comprises a plurality of bootable systems. FIG. 4 schematically illustrates a bootable system 401 according to an embodiment of the invention. In particular, the illustrated bootable system 401 comprises a launcher 403, a scheduler 405, the software under test 407, and server information 409. In brief overview, the launcher 403 and the software under test 407 both run when the particular partition boots. The launcher 403 accesses the scheduler 405, which may be a module containing instructions for returning scheduling information and/or a database of scheduling information that can be accessed and checked, to determine whether or not the relevant instance 407 of the software under test is currently scheduled to run. If the relevant instance 407 of the software under test is currently scheduled to run, the launcher 403 goes dormant for a predetermined period of time, leaving the relevant instance 407 of the software under test running, and then reactivates and again accesses the scheduler 405. If at any point the check of the scheduler 405 reveals that the relevant instance 407 of the software under test is not currently scheduled to run, then the launcher 407 runs a boot next routine. The effect of running the boot next routine is to shut down the current partition and boot up another partition on the same machine. As will be described later, the launcher 407 may perform a number of other tasks as well while it is active.

Figure 6:
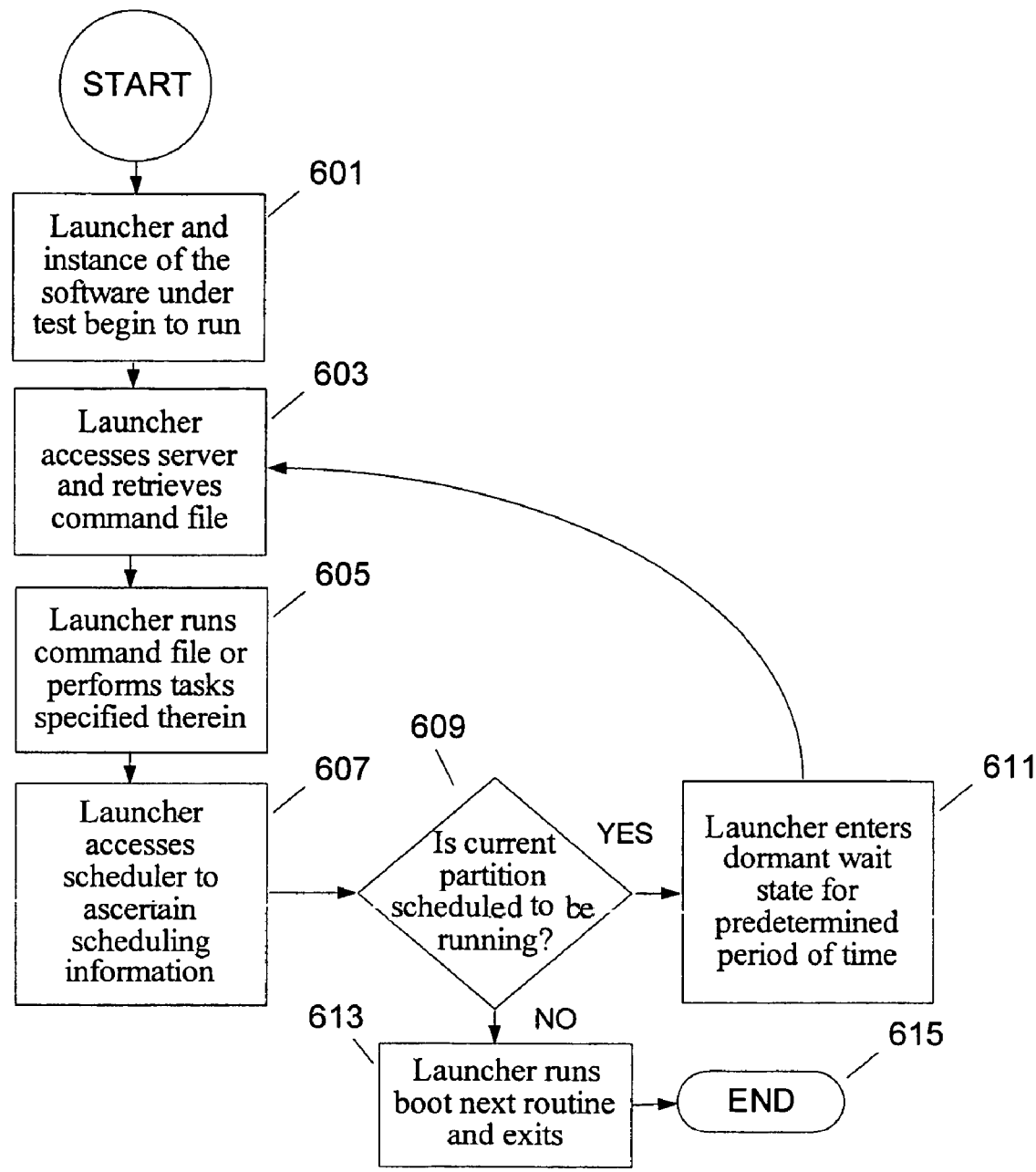
FIG. 6 is a flow chart showing steps taken in accordance with an embodiment of the invention for running a bootable system on a test machine in a test network.

The flow chart of FIG. 6 illustrates the operation of each bootable system on a machine in greater detail. The environment within which the process shown in FIG. 6 operates is one in which the bootable system shares a particular machine with one or more other bootable systems that run on a mutually exclusive basis in time. An example of an appropriate bootable system is shown in FIG. 4. The particular machine hosting the bootable systems may be linked over a network to one or more other similarly configured machines, e.g. machines that also host a number of mutually exclusive bootable systems that time share the machine.

Turning now to the illustrated process, at step 601 the launcher begins to run as does an instance of the software system under test. The running of these components may be due either to a reboot of the host machine from a prior partition on the same machine pursuant, e.g., to a boot next routine, or may be due to a boot as the host machine is initially powered up. From this point forward the instance of the software system under test continues to run until it is shut down or until the partition is shut down in favor of another partition as will be discussed. At step 603, the launcher accesses a server and retrieves a command file from the server, such as a file \\server\id.command. At step 605, the launcher runs the command file if the file is executable, or otherwise performs tasks specified therein. Examples of tasks that may be mandated by the command file include sending diagnostic or other information to the server or to another server or entity. To preserve the integrity of the test, the tasks mandated by the command file preferably, although not necessarily, occur independently of, and do not significantly impact or affect the operation of any instance of, the software under test.

At step 607, the launcher accesses the scheduler to ascertain scheduling information. Subsequently, at step 609, the launcher, using the retrieved information, determines whether the current partition is scheduled to be running. Note that the determination that a partition, and hence its instance of the software system under test, should or should not "currently" be running comprises, in an embodiment of the invention, an evaluation of whether the instance or partition is scheduled to run in a short while if not immediately. The period of time that comprises a short while in this context is not critical but may be on the order of a minute. The interaction between the launcher and the scheduler may be the retrieval of a schedule or the retrieval of specific information explicitly indicting whether the current partition should be running. In an embodiment of the invention, the launcher itself incorporates logic or scheduling information sufficient to independently determine whether the current partition should be running, and thus step 607 is omitted in this embodiment of the invention.

If at step 609 it is determined that the current partition should in fact be running, then the launcher enters a dormant wait state at step 611 for a predetermined period of time. In an embodiment of the invention, the wait state persists for about one minute, although the precise length of time is not important. Upon the expiration of the predetermined period, the process returns from step 611 to step 603 and the steps that logically follow.

If, on the other hand, it is determined at step 609 that the current partition should not be running, then the process moves to step 613, whereat the launcher runs a boot next routine and exits. Pursuant to the boot next routine, another partition on the same machine is booted up. The way in which the next partition to boot is selected may be predetermined or may be indeterminate. An example of a predetermined mechanism is a schedule, ordered list, or a simple reference in each partition to a selected one of the other partitions on the same machine. An example of an indeterminate mechanism is a routine that randomly or pseudo randomly selects from among the other partitions on the same machine. The boot next routine may be a system function that the launcher accesses via a system command or otherwise. Subsequent to step 613 the process terminates at step 615 with respect to the current partition and begins with respect to another partition. It will be appreciated that the process described is cyclical, and that the cycle will be interrupted at the tester's discretion or otherwise to end the test.

In an embodiment of the invention, the scheduling information retrieved from the scheduler by the launcher is sufficient so that the launcher does not need to again access the scheduler during the current session. In that case, step 607 would be omitted in future processing during a session once it has been executed a first time.

Having described systems and functionalities according to a general embodiment of the invention, a specific embodiment will hereinafter be described for testing a distributed system that replicates data over a network. One example of an application that establishes a distributed system of data replication is the Active Directory® product distributed by Microsoft Corporation of Redmond, Wash. Systems such as this allow for information to be replicated and made available to other machines over the network. An example of a typical usage environment is a corporation or other entity that maintains a number of sites at which a user may login. In order for the user information (e.g. user name and password) to be available to each site where login may occur, that information is typically replicated from an initial site to a central repository, such as a domain controller, and from there the information is replicated to all other machines associated with the domain controller.

This type of network may be quite large, with thousands of clients associated with a domain controller. Thus, a company that distributes such an application will typically desire to test the application for a large number of machines so that any guarantees to clients may be based on experience rather than theory or conjecture. Although the Figures illustrate a fairly small number of machines for the sake of clarity and simplicity of understanding, it will be appreciated that a network of interest for implementing distributed replication software will generally comprise a much greater number of machines.

Figure 5:
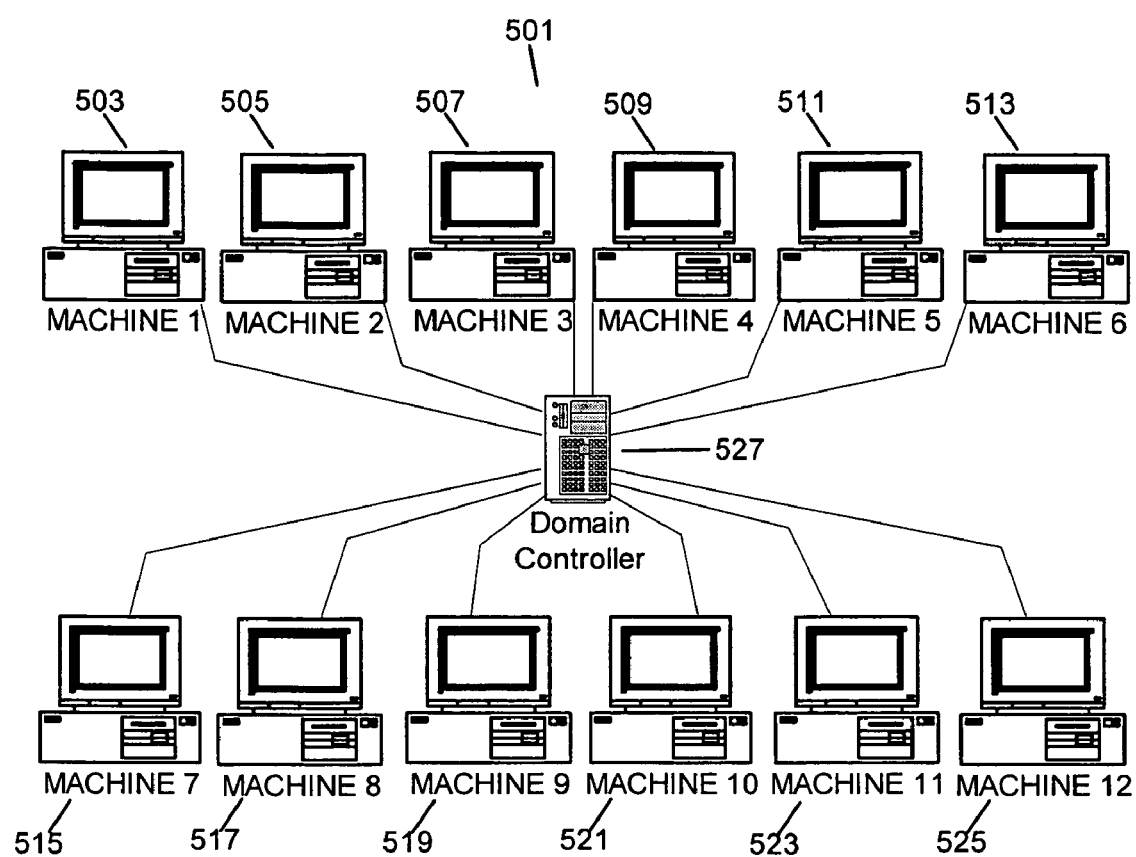
FIG. 5 is schematic diagram of a target network environment within which a distributed data replication service may be deployed.

An exemplary replication environment is illustrated in FIG. 5. In particular, twelve computers 503, 505, 507, 509, 511, 513, 515, 517, 519, 521, 523, and 525 (labeled as Machines 1 through 12) are shown connected via network connections to a domain controller 527. Machines 1–12 and their respective network connections constitute a target network. For purposes of the following discussion, a client portion of a data replication system such as Active Directory® will be referred to as the client replication application. In a distributed replication system, each of the computers 503, 505, 507, 509, 511, 513, 515, 517, 519, 521, 523, 525 has an instance of the client replication application installed and running thereon.

Figure 7:
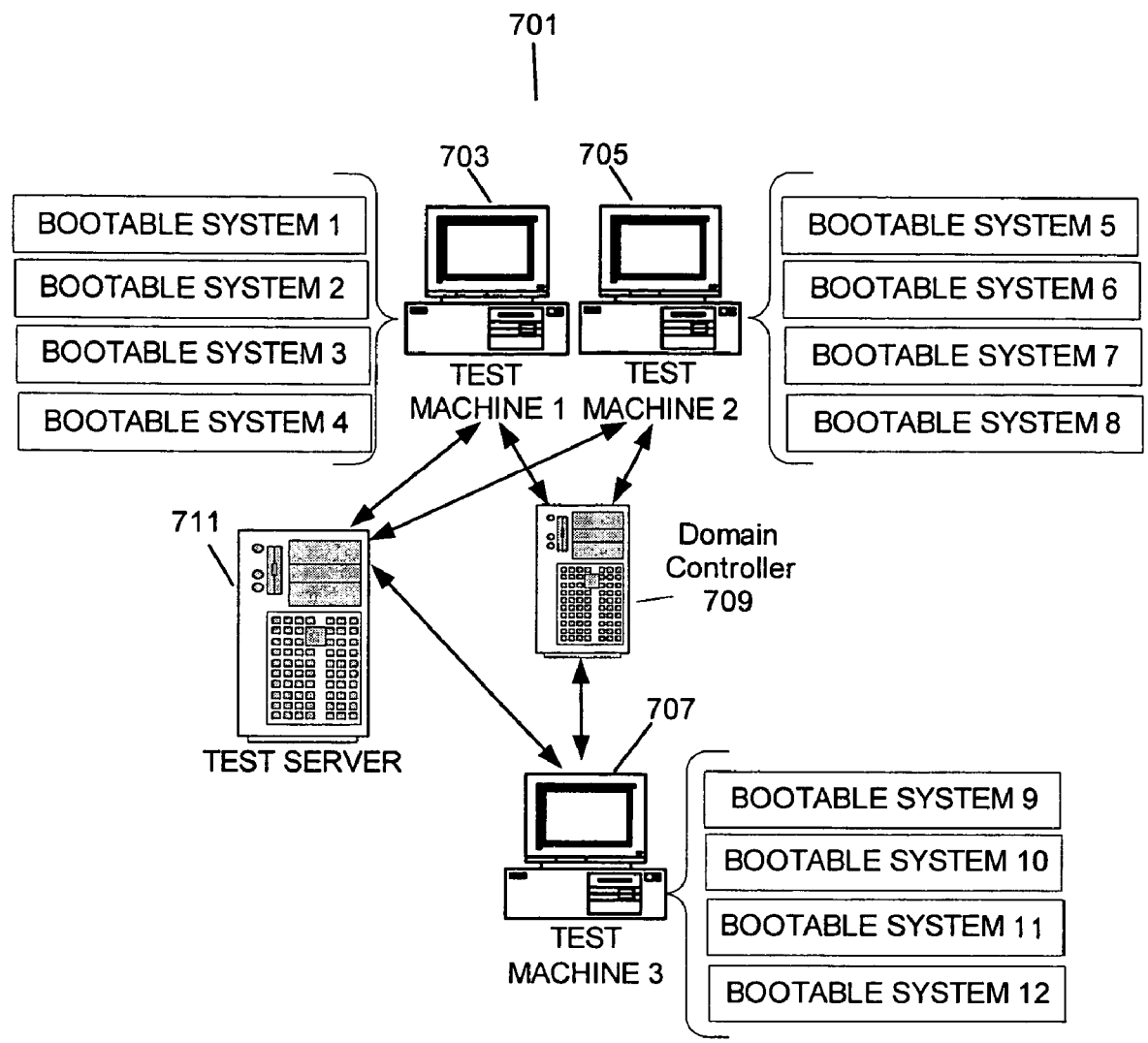
FIG. 7 is a schematic diagram of an example test network architecture corresponding to the target network architecture of FIG. 5 and others within an embodiment of the invention.
Figure 8A:
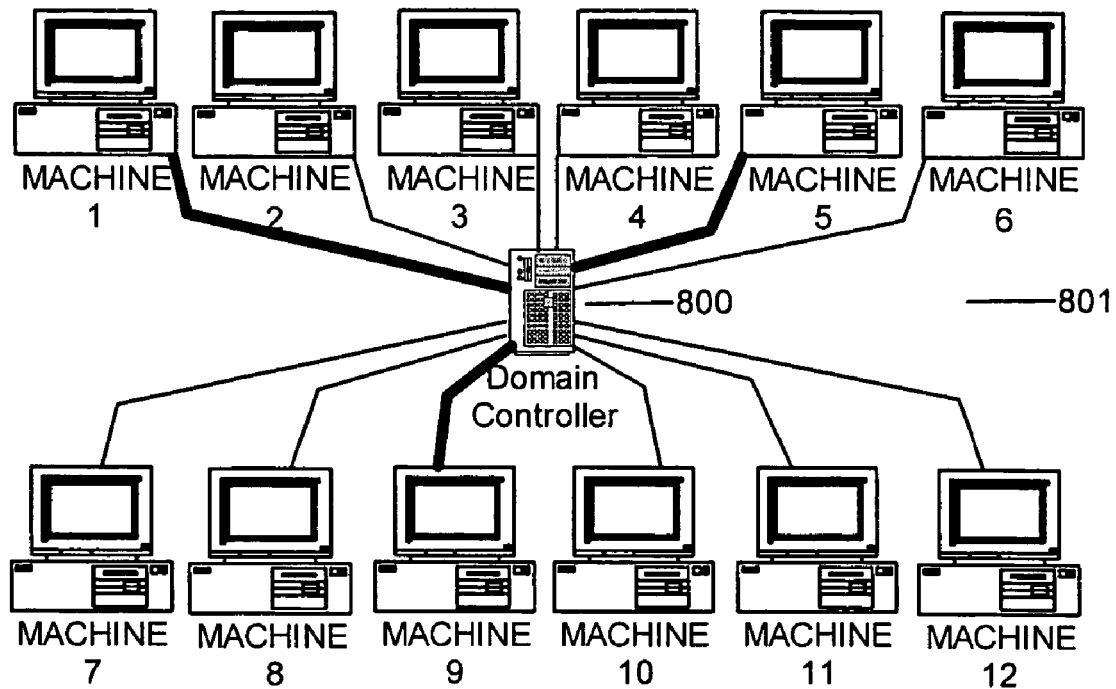
FIG. 8A is a schematic illustration of a virtual network environment corresponding to the test network of FIG. 7, wherein the test network and corresponding virtual environment are in a first state.
Figure 8B:
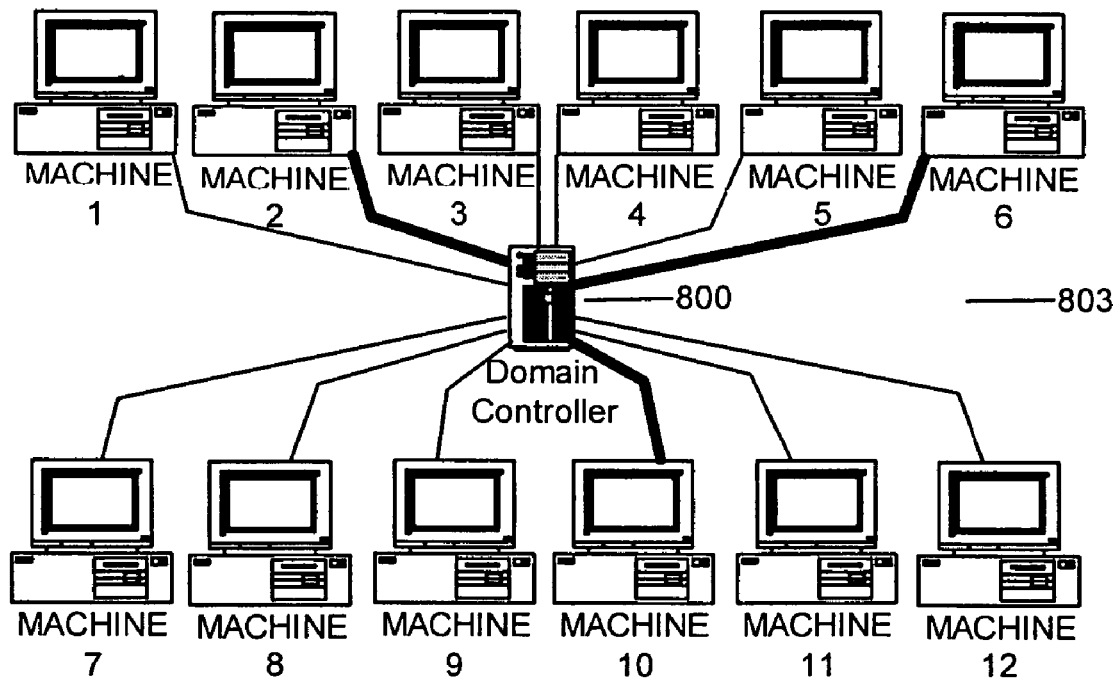
FIG. 8B is a schematic illustration of a virtual network environment corresponding to the test network of FIG. 7, wherein the test network and corresponding virtual environment are in a second state.
Figure 8C:
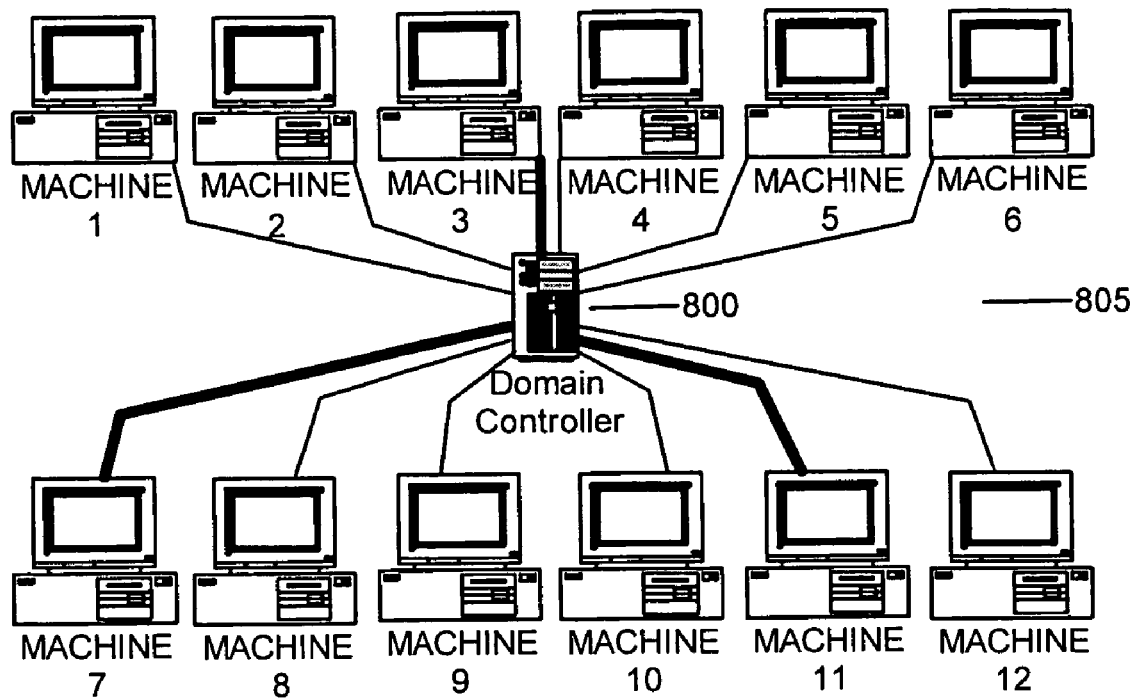
FIG. 8C is a schematic illustration of a virtual network environment corresponding to the test network of FIG. 7, wherein the test network and corresponding virtual environment are in a third state.
Figure 8D:
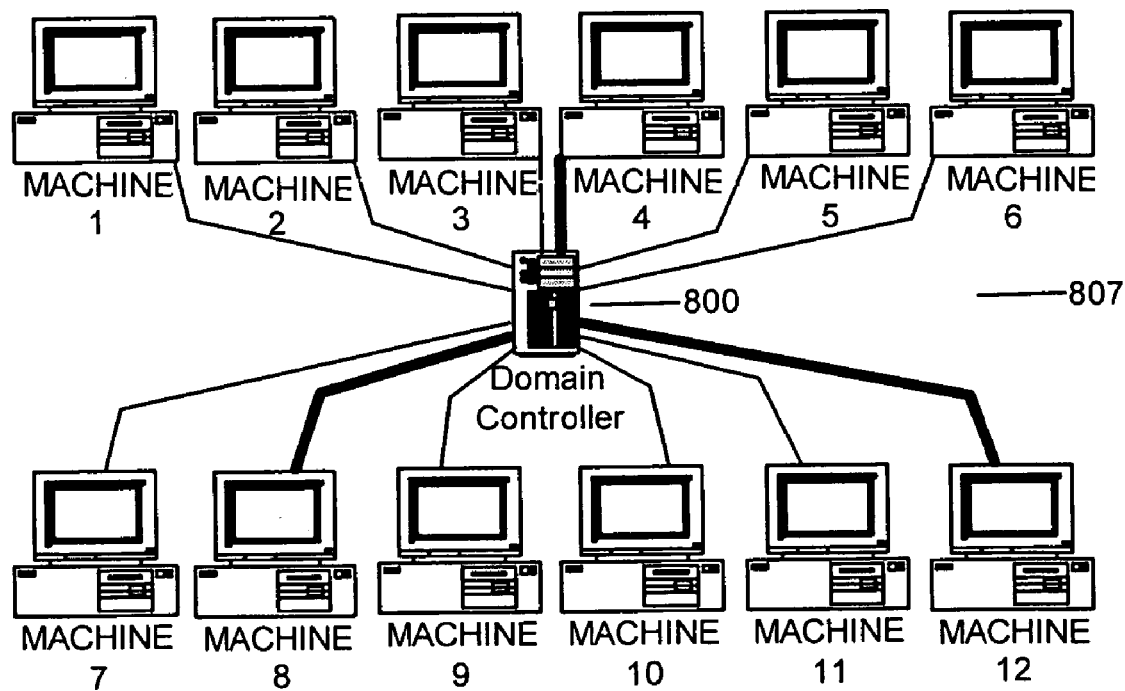
FIG. 8D is a schematic illustration of a virtual network environment corresponding to the test network of FIG. 7, wherein the test network and corresponding virtual environment are in a fourth state.

A testing architecture 701 (test network) according to an embodiment of the invention for testing the system (target network) illustrated in FIG. 5 is shown in FIG. 7. In particular, as with FIG. 3, the architecture 701 includes a lesser number of client machines than would be used in the target environment (FIG. 5). However, each of these test machines, Test Machine 1 (703), Test Machine 2 (705), and Test Machine 3 (707) comprises multiple bootable partitions each having a bootable system (shown as Bootable Systems 1–12). The bootable systems may be as described with respect to FIG. 4, i.e. comprising a launcher, scheduler, server information, and an instance of the software under test, which, with respect to FIG. 7, comprises an instance of the client replication application. The bootable systems in this system can function in the same manner described above by way of FIG. 6. The architecture 701 of FIG. 7 also comprises a domain controller 709 and a test server 711, both of which are connected via network connections to each of Test Machine 1 (703), Test Machine 2 (705), and Test Machine 3 (707).

When each instance of the client replication application is allowed to continue running, i.e. when the launcher in the same partition enters the wait state rather than triggering the boot next routine, the instance of the client replication application replicates data to and/or from the domain controller 709. In particular, the instance of the client replication application retrieves any updated or new information (i.e. information that changed or became available since the last replication) from the domain controller 709 and sends any updated or new information that it has to the domain controller. In addition, a command file, if any, is retrieved from the test server 711 and is executed or obeyed. Note that each bootable system may be associated with a different command file on the server 711, or instead each bootable system may retrieve the same command file.

Since each test machine 703, 707, 709 hosts four mutually exclusive partitions, about a quarter of the instances of the client replication application that reside in bootable systems are active at any given time. This corresponds to a virtual network having twelve computers running instances of the client replication application, in which the client replication application instances on three of the computers are active at any given time. Thus, the system tested by the test network 701 of FIG. 7 corresponds virtually to the system shown in FIG. 5, where each of machines 1–12 corresponds to one bootable system in the test network 701.

The state of the virtual system as the test proceeds is shown in FIGS. 8A–8D. In particular, machines hosting active instances of the client replication application have highlighted network connections to the domain controller 800. It can be seen that in each cycle 801, 803, 805, 807, three instances are active. Thus, after the four cycles 801, 803, 805, 807 shown, each instance has replicated once. Although the cycles shown in FIGS. 8A–8D are based on an assumption that the replication time for each instance is approximately the same, such need not be the case. In general, it is preferable to let the test proceed through a large number of cycles (such as, e.g., 10 to 30 cycles) so that at the end of the test, although some instances may have replicated more than others, each has replicated enough to demonstrate the proper function of the system as a whole.

As can be seen from FIGS. 8A–8D, the virtual system tested by the test network corresponds to system within which only a fraction (e.g. the quotient of the number of client computers in the target network and the number of test machines in the test network) is active at any given time. Thus, if there are any unintended interdependencies between computers in the target network, these will be discovered in the test network when one of the relevant bootable systems is inactive when another bootable system is attempting to use or connect to that system. In such a case, the test may fail, as may be reflected in real time diagnostic data sent to a test server or otherwise.

With respect to the schedule for each instance of the client replication application, any schedule may be used, but in an embodiment of the invention each instance is scheduled to run for a time that is approximately twice the amount of time that is expected to be needed to complete replication for that instance. Thus, where each test machine hosts x bootable partitions, and the time for replication for each instance is expected to uniformly be approximately T, then the time required for all instances to complete replication at least once is approximately xT. The time required to allow n replications per instance would thus be approximately nxT.

It will be appreciated that an improved system and method for scalability testing have been described. In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that some elements of the illustrated embodiments shown in software may be implemented in hardware and vice versa or that the illustrated embodiments can be modified in arrangement and detail without departing from the spirit of the invention. For example, although illustrations herein show relatively small target networks and test networks, the invention applies equally to much larger or much smaller target networks and/or test networks. Moreover, although certain distributed replication applications have been discussed with specificity, it will be appreciated that the invention applies as well to the scalability testing of any other distributed application, especially those where network activity is only intermittently required. In addition, there is no requirement that each test machine host the same number of bootable systems as another test machine, or that the booting schedule treat all bootable systems equivalently. Therefore, the invention as described herein contemplates all such embodiments as may come within the scope of the following claims and equivalents thereof.

We claim:

1. A test computer network for testing scalability of a distributed application to a target computer network, the test computer network comprising:
   A. at least one test computer having thereon a plurality of bootable partitions for controlling the at least one test computer on a mutually exclusive time-shared basis; and
   B. a bootable system within each of the plurality of bootable partitions, each bootable system comprising:
      i. an instance of the distributed application; and
      ii. a launcher for determining, when running, whether the bootable system is scheduled to be running, and for causing another bootable system on the same test computer to boot instead if the bootable system is not scheduled to be running.

2. The test network according to claim 1, wherein each bootable system further comprises a scheduler usable by the launcher for determining whether the bootable system is scheduled to be running.

3. The test network according to claim 1, wherein each bootable system further comprises server information usable by the launcher for retrieving a command file from a command server.

4. The test network according to claim 3, wherein the command file is usable by the launcher to cause diagnostic data to be sent to a diagnostic server.

5. The test network according to claim 4, wherein the diagnostic server and the command server reside on a single computing device.

6. The test network according to claim 1, wherein the instance of the distributed application comprises an instance of a data replication application, the test network further comprising a controller computer separate from the at least one test computer for exchanging data with the instance of the data replication application.

7. The test network according to claim 1, wherein each of the at least one test computers hosts the same number of bootable systems as each other of the at least one test computers.

8. A method of testing a distributed application for use in a target computer network using a test network having a plurality of test computers, each test computer having a plurality of bootable partitions, each bootable partition having therein a bootable system comprising an instance of the distributed application, the method comprising:
   A. booting a selected one of the bootable partitions on a test computer;
   B. running the instance of the distributed application of the bootable system associated with the selected bootable partition;
   C. determining whether the instance of the distributed application of the bootable system associated with the selected bootable partition is currently scheduled to run; and
   D. if the instance of the distributed application of the bootable system associated with the selected bootable partition is currently scheduled to run, allowing the instance to continue to run, and otherwise causing, with at least one component of the selected bootable partition, execution of a boot next routine to cause the selected one of the bootable partitions to shut down and to cause another bootable partition of the same test computer to boot.

9. The method according to claim 8, wherein the step of determining whether the instance of the distributed application of the bootable system associated with the selected bootable partition is currently scheduled to run comprises accessing a scheduler that maintains information regarding when the instance is scheduled to run.

10. The method according to claim 8, further comprising:
   E. retrieving, while the selected one of the bootable partitions is running, a command file from a remote location containing instructions; and
   F. implementing the instructions contained in the command file.

11. The method according to claim 10, wherein the step of implementing the instructions contained in the command file comprises:
   i. retrieving diagnostic information regarding the state of the selected one of the bootable partitions; and
   ii. causing the retrieved diagnostic information to be transmitted to a remote location.

12. The method according to claim 8, wherein the distributed application is a distributed data replication application, and wherein the step of allowing the instance to continue to run comprises exchanging data between the instance of the distributed application and a remote computer.

13. An apparatus for testing a distributed application for use in a target computer network using a test network having a plurality of test computers, each test computer having a plurality of bootable partitions, each bootable partition having therein a bootable system comprising an instance of the distributed application, the apparatus comprising:
   A. means for booting a selected one of the bootable partitions on a test computer;
   B. means for running the instance of the distributed application of the bootable system associated with the selected bootable partition;
   C. means for determining whether the instance of the distributed application of the bootable system associated with the selected bootable partition is currently scheduled to run; and
   D. means for allowing the instance to continue to run if the instance of the distributed application of the bootable system associated with the selected bootable partition is currently scheduled to run, and for otherwise causing execution of a boot next routine to cause the selected one of the bootable partitions to shut down and to cause another bootable partition of the same test computer to boot, the boot next routine comprising a portion of the selected bootable partition.

14. The apparatus according to claim 13, further comprising:
   E. means for retrieving, while the selected one of the bootable partitions is running, a command file from a remote location containing instructions; and
   F. means for implementing the instructions contained in the command file.

15. The apparatus according to claim 14, wherein the means for implementing the instructions contained in the command file comprise:
   i. means for retrieving diagnostic information regarding the state of the selected one of the bootable partitions; and
   ii. means for causing the retrieved diagnostic information to be transmitted to a remote location.

16. The apparatus according to claim 13, wherein the distributed application is a distributed data replication application and wherein the means for allowing the instance to continue to run further comprises means for exchanging data between the instance of the distributed application and a remote computer.

17. A computer readable medium having thereon computer readable instructions for performing a method of testing a distributed software system for use in a target computer network using a test network having a plurality of test computers, each test computer having a plurality of bootable partitions, each bootable partition having therein a bootable system comprising an instance of the distributed software system, the computer readable instructions comprising instructions for:
   A. booting a selected one of the bootable partitions on a test computer;
   B. running the instance of the distributed software system of the bootable system associated with the selected bootable partition;
   C. determining whether the instance of the distributed software system of the bootable system associated with the selected bootable partition is currently scheduled to run; and D. if the instance of the distributed software system of the bootable system associated with the selected bootable partition is currently scheduled to run, allowing the instance to continue to run, and otherwise using a component of the selected bootable partition to cause execution of a boot next routine to cause the selected one of the bootable partitions to shut down and another bootable partition of the same test computer to boot.

18. The computer readable medium according to claim 17, further comprising computer readable instructions for:
E. retrieving, while the selected one of the bootable partitions is running, a command file from a remote location containing instructions; and
F. implementing the instructions contained in the command file.

19. The computer readable medium according to claim 18, wherein the computer readable instructions for implementing the instructions contained in the command file comprise computer readable instructions for:
  i. retrieving diagnostic information regarding the state of the selected one of the bootable partitions; and
  ii. causing the retrieved diagnostic information to be transmitted to a remote location.

20. The computer readable medium according to claim 17, wherein the distributed software system is a distributed data replication system, and wherein the computer readable instructions for allowing the instance to continue to run comprise computer readable instructions for exchanging data between the instance of the distributed software system and a remote computer.

* * * * *